United States Patent
Choi et al.

(10) Patent No.: US 8,642,002 B2
(45) Date of Patent: Feb. 4, 2014

(54) HYDROGEN GAS PRODUCTION SYSTEM UTILIZING SILICON WASTEWATER AND METHOD FOR PRODUCTION OF HYDROGEN ENERGY USING THE SAME

(75) Inventors: Chae-Seok Choi, Seoul (KR); Ji-Hyeon Hwang, Ansan-si (KR); Youn-Kook Kim, Seoul (KR)

(73) Assignee: Woongjin Coway Co., Ltd. (KR)

( * ) Notice: Subject to any disclaimer, the term of this patent is extended or adjusted under 35 U.S.C. 154(b) by 377 days.

(21) Appl. No.: 13/012,297

(22) Filed: Jan. 24, 2011

(65) Prior Publication Data

US 2011/0200521 A1   Aug. 18, 2011

(30) Foreign Application Priority Data

Feb. 17, 2010   (KR) .................. 10-2010-0014324

(51) Int. Cl.
   *C01B 3/00*       (2006.01)
   *C01B 3/02*       (2006.01)

(52) U.S. Cl.
   USPC ........ 423/648.1; 422/105; 422/232; 423/644; 423/657

(58) Field of Classification Search
   None
   See application file for complete search history.

(56) References Cited

U.S. PATENT DOCUMENTS

| | | | | |
|---|---|---|---|---|
| 4,915,844 | A | * | 4/1990 | Imamura et al. ............. 210/651 |
| 7,493,765 | B2 | | 2/2009 | Akiyama et al. |
| 2010/0150821 | A1 | * | 6/2010 | Bauch et al. ............. 423/648.1 |

FOREIGN PATENT DOCUMENTS

| | | | |
|---|---|---|---|
| JP | 08035640 A | * | 2/1996 |
| JP | 2000-191303 | | 7/2000 |
| JP | 2001-213609 | | 8/2001 |
| JP | 2006-240935 | | 9/2006 |

OTHER PUBLICATIONS

JP 08035640, Ikeda et al, Feb. 1996, English Abstract.*

* cited by examiner

*Primary Examiner* — Melvin C Mayes
*Assistant Examiner* — Colin W Slifka
(74) *Attorney, Agent, or Firm* — Cantor Colburn LLP

(57) ABSTRACT

Disclosed are a hydrogen energy production system utilizing silicon wastewater and a method for production of hydrogen energy using the same. More particularly, the disclosed system includes: a UF treatment bath wherein the silicon wastewater is treated through UF film filtration to separate UF treated water and a concentrated silicon waste solution therefrom; a line mixer connected to the UF treatment bath in order to admix the separated silicon waste solution with an alkaline material fed from the outside; and a hydrogen production bath connected to the line mixer, wherein the concentrated silicon waste solution in the mixture reacts with the alkaline material, in order to produce hydrogen gas. Additionally, a hydrogen energy production method using the foregoing system is also disclosed.

5 Claims, 3 Drawing Sheets
(1 of 3 Drawing Sheet(s) Filed in Color)

HYDROGEN GAS PRODUCTION SYSTEM UTILIZING SILICON WASTEWATER AND METHOD FOR PRODUCTION OF HYDROGEN ENERGY USING THE SAME

BACKGROUND OF THE INVENTION

1. Field of the Invention

The present invention relates to a system for production of hydrogen energy utilizing silicon wastewater in order to create an additional energy resource, and a method for production of hydrogen energy using the same.

2. Description of the Related Art

As advanced information and communication industries, semiconductor industries, exhaustion of petroleum energy, as well as industries using solar energy to prevent global warming recently come to the fore, demand for silicon wafers is rapidly increasing.

In general, a silicon wafer is fabricated by providing a slurry containing a cutting oil and an abrasive material (i.e., silicon carbide, aluminum oxide, silicon dioxide, etc.) and cutting the wafer using a wire saw.

The cut silicon wafer, which is generally covered with waste slurry admixed with saw dust as well as the used slurry containing the cutting oil and the abrasive material, is then delivered to a cleaning apparatus (wire saw cleaner) wherein a washing process involving sonication in a cleaning solution (DI water) containing a cleaner (surfactant) is executed, thereby producing a silicon wafer for solar cells. Otherwise, a semiconductor silicon wafer may be fabricated by polish-etching and washing processes. The forgoing ingot processing typically generates a certain amount of silicon wastewater containing cut solids and the slurry in a cleaning solution.

Therefore, a conventional method used in the art generally includes filtering silicon wastewater through a pressure microfiltration ("MF") membrane to produce industrial water and use the same while treating concentrated wastewater generated during filtering by UF membrane filtration, so as to reuse ultrafiltration ("UF") treated water and discard the residual concentrated wastewater without further treatment.

However, the concentrated wastewater remaining after primary treatment of the silicon wastewater is excessively concentrated and causes abnormal conditions such as clogging of UF membranes to be used for any further process, for example, UF membrane filtration. As a result, the conventional method entails a problem in that recovery of the production water from the silicon wastewater is not enhanced to a desired level.

Further, since the concentrated wastewater generated from the silicon wastewater is discarded without treatment, there may incur a high relatively disposal cost amounting to from 60,000 to 80,000 won per ton.

SUMMARY OF THE INVENTION

Therefore, the present invention is directed to solving the above problems and an object of the present invention is to provide a hydrogen energy production system utilizing silicon wastewater, including secondary treatment of the silicon wastewater to improve recovery thereof to a desired level, and a method for production of hydrogen energy using silicon wastewater by the foregoing system.

Another object of the present invention is to provide a hydrogen energy production system utilizing silicon wastewater in order to produce hydrogen gas therefrom and create a new energy resource, and a method for production of hydrogen energy using silicon wastewater by the foregoing system.

A still further object of the present invention is to provide a hydrogen energy production system utilizing silicon wastewater, which includes solidification of the residual waste remaining in the silicon wastewater, thus decreasing waste mass and efficiently reducing waste disposal costs, and a method for production of hydrogen energy using silicon wastewater by the foregoing system.

In order to accomplish the objects described above, a system for production of hydrogen energy utilizing silicon wastewater according to the present invention, comprises: an ultrafiltration ("UF") treatment bath wherein the silicon wastewater is treated through UF film filtration to separate UF treated water and a concentrated silicon waste solution therefrom; a line mixer connected to the UF treatment bath to admix the separated silicon waste solution with an alkaline material fed from the outside; and a hydrogen production bath connected to the line mixer, wherein the concentrated silicon waste solution reacts with the alkaline material in the mixture, in order to produce hydrogen gas.

The inventive system also includes a waste solution bath connected to the UF treatment bath wherein the concentrated silicon waste solution, after separation, is stored and introduced into the line mixer.

The inventive system may further include: a first production bath connected to the UF treatment bath to store UF treated water; and a hot water feed tank connected to the first production bath to add hot water to the UF treated water.

In addition, the inventive system may include an alkaline material tank connected to the line mixer wherein the alkaline material is stored and fed to the line mixer.

The alkaline material tank of the inventive system may be electrically connected to a dehumidifier to control humidity of the alkaline material, thus suitably maintaining a desired humidity thereof.

The inventive system may also include a hydrogen gas collector connected to the hydrogen production bath, in order to trap and store hydrogen generated in the hydrogen production bath.

The inventive system may further have an acidity adjuster connected to the hydrogen production bath, wherein an acidic material is stored and fed to the hydrogen production bath in order to neutralize alkaline water generated in the course of producing hydrogen gas.

The inventive system may additionally have a second production bath connected to the hydrogen production bath to store a supernatant formed in the hydrogen production bath.

The inventive system may further include a centrifuge connected to the hydrogen production bath, wherein a precipitate formed during neutralization is received, dehydrated and discharged to the outside.

The centrifuge of the inventive system is connected to both the UF treatment bath and the second production bath, and receives the concentrated silicon waste solution from the UF treatment bath and the precipitate settled in the second production bath and discards the same after dehydration.

In order to accomplish the foregoing objects, a method for production of hydrogen energy using silicon wastewater according to the present invention, comprises: treating the silicon wastewater through UF membrane filtration to separate UF treated water and a concentrated silicon waste solution therefrom;

admixing the separated silicon waste solution with an alkaline material;

reacting the concentrated silicon waste solution with the alkaline material in the mixture to produce hydrogen gas and alkaline water; and using an acidic material to neutralize the alkaline water, thereby producing a supernatant and a precipitate.

The inventive method also includes dehydrating the precipitate to obtain solids, which are then discarded.

The inventive method may use at least one selected from a group consisting of NaOH, KOH, MgOH, $CaOH_2$, $FeOH_2$, $NH_2OH$, $Na_2CO_3$, $NaBH_4$ and mixtures thereof, as the alkaline material.

According to the inventive method, the alkaline water may have a pH range of 12 to 13.

The inventive method may use at least one selected from a group consisting of HCl, $HNO_3$ and mixture thereof, as the acidic material.

According to the inventive method, neutralization is performed to adjust the pH of the alkaline water to 7 to 10.

As described above, the present invention may perform secondary treatment of treated water obtained from silicon wastewater in order to reuse the finally treated water, thereby improving recovery of the treated water to a desired level.

The present invention may trap hydrogen gas from the silicon wastewater thus realizing a novel energy resource.

In addition, the present invention may solidify the residual waste remaining in the silicon wastewater in order to decrease waste mass, thereby efficiently reducing waste disposal costs.

BRIEF DESCRIPTION OF THE DRAWINGS

The patent or application file contains at least one drawing executed in color. Copies of this patent or patent application publication with color drawings will be provided by the office upon request and payment of the necessary fee.

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, a detailed description will be given of a hydrogen energy production system utilizing silicon wastewater according to preferred embodiments of the present invention, with reference to the accompanying drawings.

Figure 1:
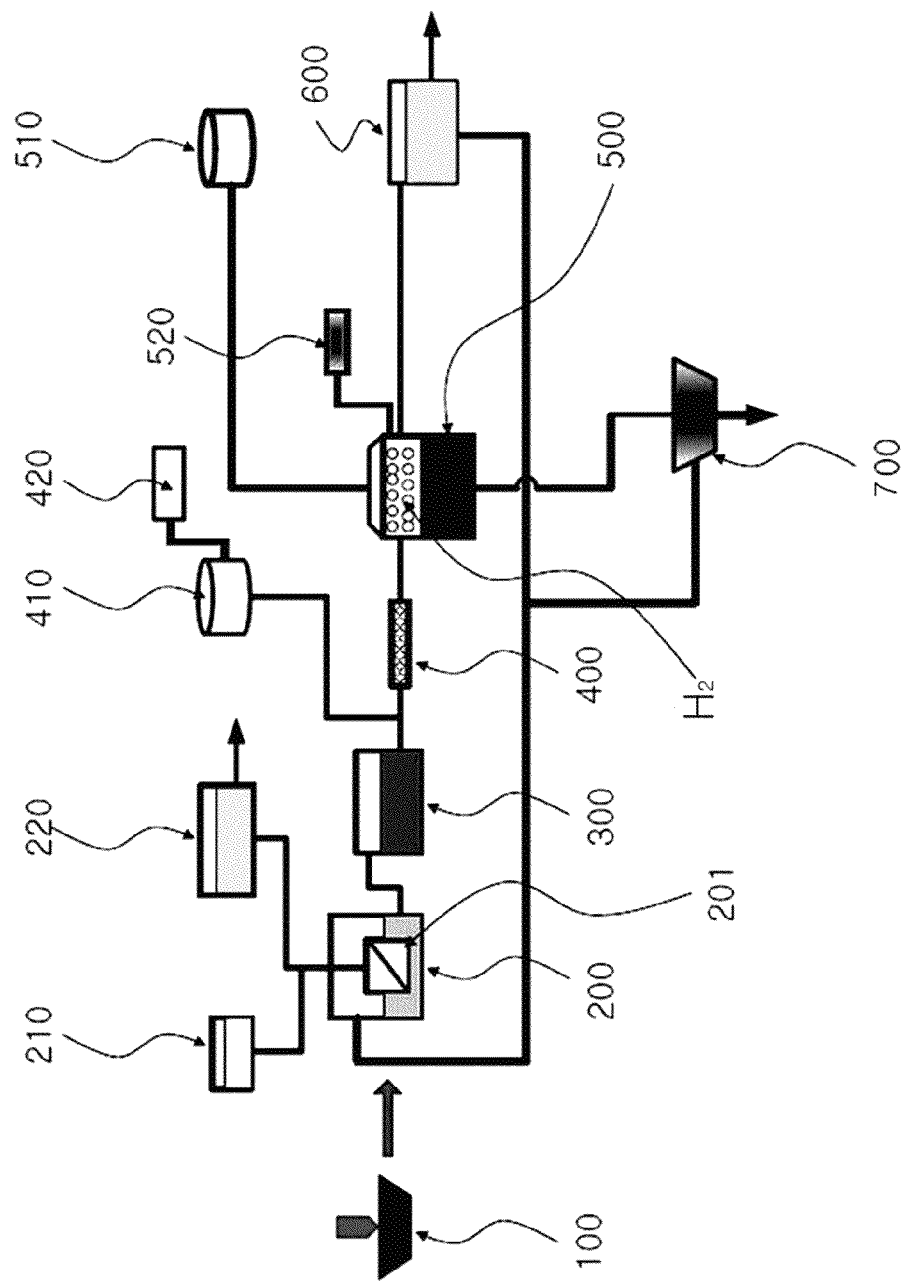
FIG. 1 is a schematic view illustrating a hydrogen energy production system utilizing silicon wastewater according to the present invention.

FIG. 1 is a schematic view illustrating a hydrogen energy production system utilizing silicon wastewater according to the present invention.

Referring to FIG. 1, the hydrogen energy system utilizing silicon wastewater of the present invention includes an ultrafiltration ("UF") treatment bath 200, a line mixer 400 and a hydrogen production bath 500.

The UF treatment bath 200 receives the silicon wastewater, filters the same through a submerged type UF membrane 201 installed inside the UF treatment bath 200, and separates UF treated water and a concentrated silicon waste solution from the wastewater. In this case, the silicon wastewater means a silicon-containing waste solution generated during ingot processing, semiconductor manufacturing, etc. According to one embodiment of the present invention, the silicon wastewater generated from an ingot processing part 100 during ingot processing is delivered to the UF treatment bath and treated therein.

A concentrated silicon waste solution and UF treated water separated in the UF treatment bath 200 are stored in a waste solution storage tank 300 and a first production bath 220, respectively, both of which are connected to the UF treatment bath 200. The first production bath 220 is also connected to a hot water feed tank 210 storing hot water, in order to receive the hot water therefrom and sterilize the UF treated water.

A line mixer 400 is connected to the UF treatment bath 200, receives the concentrated silicon waste solution from the waste solution storage tank 300 and an alkaline material fed from the outside, and mixes these materials. The alkaline material communicates with the line mixer and is provided from an alkaline material tank 410. The alkaline material tank 410 may be electrically connected to a dehumidifier 420 to control and maintain a constant humidity of the alkaline material stored in the tank.

The alkaline material is not particularly limited so long as it reacts with silicon to generate hydrogen gas and may include hydroxide based alkaline materials. For instance, hydroxides of alkali metals and/or alkali-earth metals may be used and, more preferably, at least one selected from a group consisting of NaOH, KOH, MgOH, $CaOH_2$, $FeOH_2$, $NH_4OH$, $Na_2CO_3$, $NaBH_4$ and mixtures thereof may be used. According to the present invention, the line mixer 400 admixes the concentrated silicon waste solution with the alkaline material in the mixture to increase contact area therebetween, thereby enabling generation of hydrogen gas in a hydrogen production bath 500.

The hydrogen production bath 500 is connected to the line mixer 400 to conduct reaction of the concentrated silicon waste solution with the alkaline material, both of which were admixed in the line mixer 400, thus generating hydrogen gas. Such generated hydrogen gas is trapped in a hydrogen gas collector 510 connected to the hydrogen production bath 500, and separately stored therein. Accordingly, the present invention may maintain a predetermined recovery rate of treated water from silicon wastewater and generate hydrogen gas from the treated water, which in turn traps and stores a constant amount of the hydrogen gas in the gas collector 510, thereby securing an additional energy source (based on the trapped hydrogen gas).

The hydrogen production bath 500 is connected to an acidity adjuster 520 to receive an acidic material stored in the acidity adjuster 520, neutralizes alkaline water generated in the course of producing the hydrogen gas, so as to produce a supernatant and a precipitate. Here, the acidic material may be HCl, $NNO_3$ or a mixture thereof. The foregoing acidity adjuster 520 may control supply of the acidic material to a level sufficient to neutralize the alkaline water to a desired pH value, through a sensor and a control part.

The formed precipitate is delivered to a centrifuge 700 connected to the hydrogen production bath 500 and the centrifuge 700 may dehydrate the precipitate to remove moisture therefrom, form solids and discharge the same to the outside.

Meanwhile, a second production bath 600 communicates with the hydrogen production bath 500 to receive and store the supernatant.

Another centrifuge 700 may be connected to both the UF treatment bath 200 and the second production bath 600. Accordingly, the centrifuge 700 receives the concentrated silicon waste solution overflowing from the UF treatment bath 200 and the remaining precipitate settled in the second production bath 600, dehydrates and solidifies these materials, and may discharge the formed solids for disposal purposes to the outside.

The following detailed description will be given to explain a hydrogen energy production method using the hydrogen energy production system utilizing silicon wastewater as described above.

Figure 2:
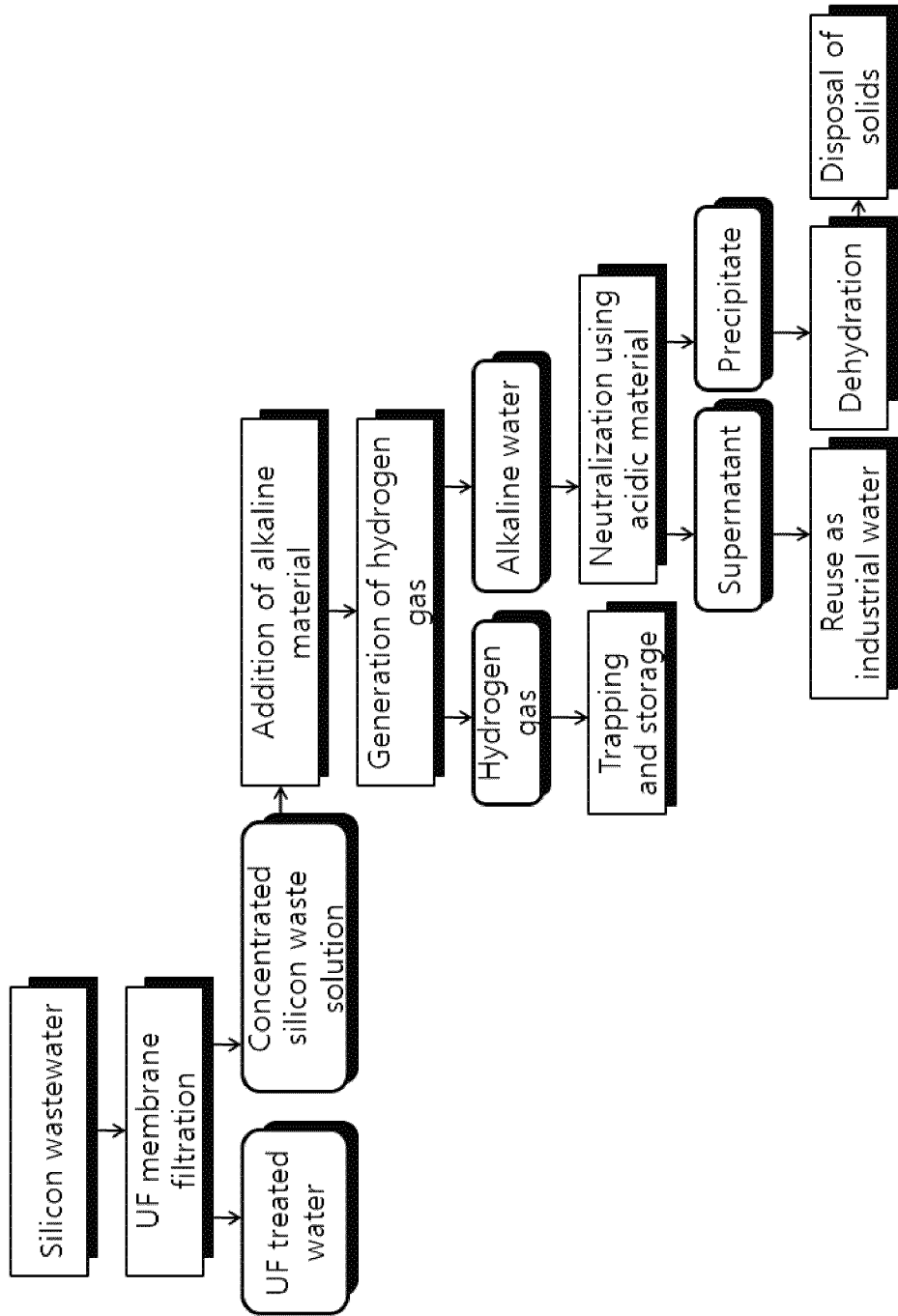
FIG. 2 is a flow diagram illustrating a method for production of hydrogen energy utilizing silicon wastewater according to the present invention.

FIG. 2 is a flow diagram illustrating a hydrogen energy production method utilizing silicon wastewater according to the present invention.

Referring to FIG. 2, a method for production of hydrogen using silicon wastewater comprises:

treating the silicon wastewater through UF membrane filtration to separate UF treated water and a concentrated silicon waste solution;

admixing the separated silicon waste solution with an alkaline material;

reacting the concentrated silicon waste solution with the alkaline material in the mixture, so as to generate hydrogen gas and alkaline water; and neutralizing the alkaline waster with an acidic material to produce a supernatant and a precipitate.

Hereinafter, respective processes of the foregoing method will be described in detail.

First, the silicon wastewater is treated through UF membrane filtration.

According to an exemplary embodiment of the present invention, silicon wastewater generated during, for example, ingot processing is delivered from an ingot processing part 100 to a UF treatment bath 200, and subjected to filtering in a submerged type UF membrane 201. According to the forgoing process, the silicon wastewater is separated into UF treated water and a concentrated silicon waste solution. The UF treated water and the concentrated silicon waste solution are respectively delivered into a first production bath 220 and a waste solution storage tank 300.

In this case, the UF treated water fed to the first production bath 220 may be admixed with hot water provided from a hot water feed tank 210, so as to be sterilized and cleaned.

Following this, the concentrated silicon waste solution is admixed with the alkaline material.

The concentrated silicon waste solution stored in the waste solution storage tank 300 as well as an alkaline material contained in an alkaline material tank 410 are introduced into a line mixer 400 and admixed therein. The alkaline material is substantially the same as described above.

Next, the concentrated silicon waste solution and the alkaline material in the mixture react with each other to generate hydrogen gas and alkaline water.

More particularly, the concentrated silicon waste solution mixed and the alkaline material in the line mixer 400 interact in a hydrogen production bath 500 and generate hydrogen gas. In this case, alkaline water is generated as a by-product.

For instance, when silicon contained in the waste solution reacts with NaOH as an alkaline material, hydrogen gas may be generated according to the following chemical scheme 1:

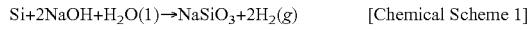
$$Si+2NaOH+H_2O(l) \rightarrow NaSiO_3+2H_2(g)$$ [Chemical Scheme 1]

Such generated hydrogen gas is isolated and stored in a hydrogen collector 510 connected to the hydrogen production bath 500.

Finally, the alkaline water is neutralized using an acidic material, so as to produce a supernatant and a precipitate.

After isolation of the hydrogen gas, the alkaline water remaining in the hydrogen production bath 500 has a pH range of 12 to 13. Using an acidic material provided from an acidity adjuster 520, the alkaline water remaining in the hydrogen production bath 500 may be neutralized to pH 7 to 10. Here, the acidic material may be HCl, HNO$_3$ or a mixture thereof.

Figure 3:
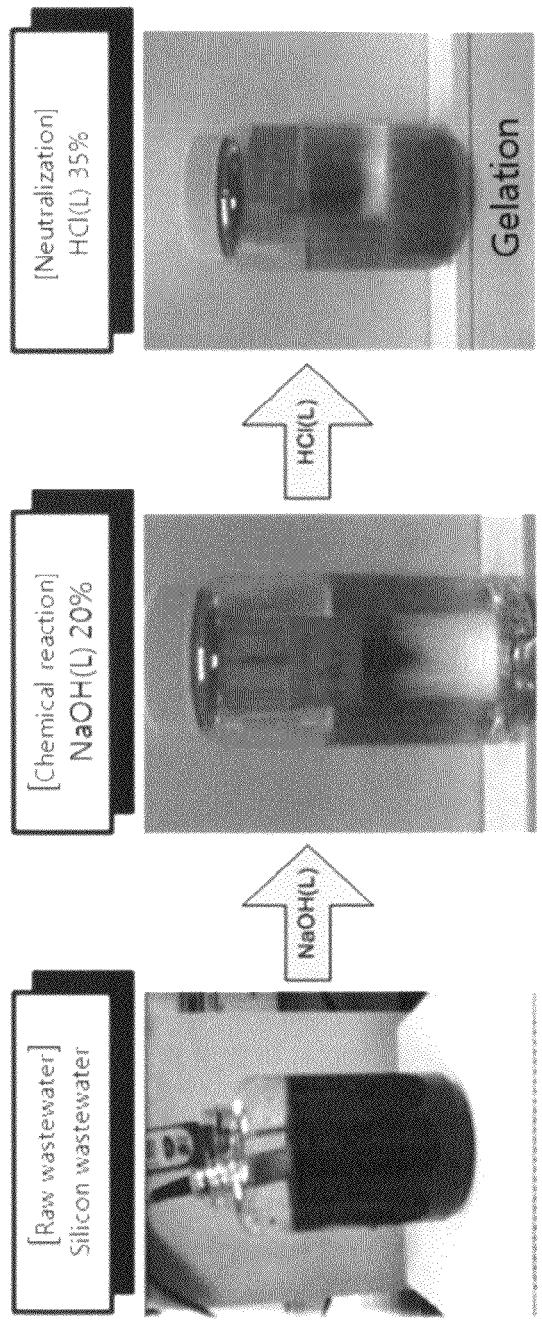
FIG. 3 is photographs showing processes of forming hydrogen gas and neutralizing the same according to the present invention.

FIG. 3 is photographs showing processes of forming hydrogen gas and neutralizing the same according to the present invention.

Referring to FIG. 3, neutralizing the alkaline water with an acidic material may separate a supernatant and a precipitate in gel form. Such a supernatant overflows and is delivered from the hydrogen production bath 500 to the second production bath 600. The delivered supernatant may be further recycled and reused as industrial water.

Accordingly, the present invention may generate hydrogen gas and enable isolation of a supernatant and reuse thereof as industrial water, and therefore, may enhance recovery of treated water, which is reusable in processes, from silicon wastewater.

Moreover, the precipitate is subjected to dehydration to provide solid waste which is in turn discarded.

The present invention may further include dehydration as described above, so as to solidify a final waste in a cake form to be disposed of, thereby reducing waste mass and considerably reducing waste disposal costs.

What is claimed is:

1. A system for production of hydrogen gas utilizing silicon wastewater, comprising:
   an ultrafiltration ("UF") treatment bath having a UF membrane submerged therein and receiving the silicon wastewater, wherein the silicon wastewater is separated into UF treated water and a concentrated silicon waste solution;
   a waste solution storage tank connected to the UF treatment both and receiving the concentrated silicon waste solution from the UF treatment bath;
   a line mixer connected to the waste solution storage tank and receiving the concentrated silicon waste solution from the waste solution storage tank and an alkaline material fed from an alkaline material tank, wherein the line mixer admixes the concentrated silicon waste solution and the alkaline material;
   a dehumidifier electrically connected to the alkaline material tank to control humidity of the alkaline material at a predetermined level;
   a hydrogen production bath connected to the line mixer and receiving a mixture of the concentrated silicon waste solution and the alkaline material from the line mixer, wherein the concentrated silicon waste solution in the mixture reacts with the alkaline material, in order to produce hydrogen gas;
   an acidity adjuster connected to the hydrogen production bath, wherein an acidic material is stored and fed into the hydrogen production bath to neutralize alkaline water generated in the course of producing hydrogen gas; and
   a centrifuge connected to the hydrogen production bath and receiving a precipitate generated in the hydrogen production bath and dehydrating the precipitate.

2. The system according to claim 1, further comprising: a first production bath connected to the UF treatment bath and receiving the UF treated water; and a hot water feed tank connected to the first production bath to feed hot water to the UF treated water.

3. The system according to claim 1, further comprising: a hydrogen gas collector connected to the hydrogen production bath to trap and store the hydrogen generated in the hydrogen production bath.

4. The system according to claim 1, further comprising: a second production bath connected to the hydrogen production bath to store a supernatant generated by neutralization.

5. The system according to claim 4, wherein the centrifuge is connected to both the UF treatment bath and the second production bath, wherein the concentrated silicon waste solution fed from the UF treatment bath and the precipitate settled in the second production bath are received, subjected to dehydration, and discharged to the outside.

\* \* \* \* \*